(12) United States Patent
Ito et al.

(10) Patent No.: US 6,474,114 B1
(45) Date of Patent: Nov. 5, 2002

(54) DRUM TYPE WASHING MACHINE WITH ALIGNING STRUCTURE FOR ROTOR AND STATOR OF DRIVE MOTOR

(75) Inventors: Masumi Ito, Seto; Fumitaka Yamazaki, Owariasahi, both of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/572,929

(22) Filed: May 18, 2000

(30) Foreign Application Priority Data

| May 19, 1999 | (JP) | 11-138507 |
| May 25, 1999 | (JP) | 11-144892 |

(51) Int. Cl.[7] ............................................. D06F 37/26
(52) U.S. Cl. .............................................. 68/140; 68/24
(58) Field of Search ........................ 68/12.12, 24, 140

(56) References Cited

U.S. PATENT DOCUMENTS

| 3,064,152 A | * | 11/1962 | DePaul et al. |
| 3,742,595 A | * | 7/1973 | Lykes |
| 4,274,023 A | * | 6/1981 | Lamprey |
| 4,853,571 A | * | 8/1989 | Smith et al. |
| 4,921,371 A | * | 5/1990 | Boiraeu et al. |
| 5,081,388 A | * | 1/1992 | Chen |
| 5,266,855 A | * | 11/1993 | Smith et al. |
| 5,809,809 A | * | 9/1998 | Neumann |
| 5,862,686 A | | 1/1999 | Skrippek ...................... 68/140 |
| 5,894,746 A | | 4/1999 | Skrippek ...................... 68/140 |
| 6,131,422 A | * | 10/2000 | Skrippek et al. |

FOREIGN PATENT DOCUMENTS

| DE | 2613984 | * | 5/1978 |
| DE | 43 35 966 | | 4/1995 |
| DE | 198 06 258 | | 8/1998 |
| EP | 413 915 | | 2/1991 |
| EP | 657 575 | | 6/1995 |
| FR | 1 340 648 | | 1/1964 |

\* cited by examiner

Primary Examiner—Frankie L. Stinson
(74) Attorney, Agent, or Firm—Pillsbury Winthrop LLP

(57) ABSTRACT

A drum type washing machine includes an outer cabinet, a water tub mounted in the outer cabinet and having a rear end plate, a generally drum-shaped rotating tub rotatably mounted in the water tub and having a rear wall, a rotating tub shaft mounted on a center of the rear wall of the rotating tub and having a rear end projecting rearward to be located in the rear of the rear end plate of the water tub, an electric motor for rotating the rotating tub via the rotating tub shaft, the motor including a stator mounted on the rear end plate of the water tub and a rotor connected to the rear end of the rotating tub shaft, and an aligning structure for aligning a center of rotation of the rotor and a center of the stator.

13 Claims, 14 Drawing Sheets

DRUM TYPE WASHING MACHINE WITH ALIGNING STRUCTURE FOR ROTOR AND STATOR OF DRIVE MOTOR

BACKGROUND OF THE INVENTION

1. Field of the Invention

This invention relates generally to drum type washing machines, and more particularly to such a drum type washing machine including an electric motor directly rotating a rotating tub.

2. Description of the Prior Art

FIG. 14 illustrates one of conventional drum type washing machines. The shown drum type washing machine comprises an outer cabinet 1 and a water tub 2 elastically supported by a plurality of suspension mechanisms 3 in the cabinet. A drum-shaped rotating tub 4 is provided for rotation in the water tub 2. A bearing housing 6 is mounted on a rear wall of the water housing 2. The rotating tub 4 has a shaft 5 extending rearward from a rear thereof. The shaft 5 is supported on bearings 7 and 8 held in the bearing housing 6. The shaft 5 has a rear end to which a driven pulley 9 is mounted. A motor support 10 is mounted on a lower portion of the water tub 2. An electric motor 11 is supported by the motor support 10. The motor 11 includes a rotational shaft 12 on which a driving pulley 13 is mounted. A transmission belt 14 extends between the driving and driven pulleys 13 and 9.

In the above-described construction, torque developed by the motor 11 is transmitted via the shaft 12, driving pulley 13, belt 14 and driven pulley 9 to the shaft 5 so that the rotating tub 4 is rotated. However, a belt transmission mechanism including the driving and driven pulleys 13 and 9 and the belt 14 complicates the construction of the washing machine and accordingly increases the manufacturing cost. Furthermore, each of the pulleys 13 and 9 and the belt 14 produces oscillation or vibration in the transmission of motor torque. In particular, high-speed rotation of the motor 11 causes the belt 14 to slip, thereby swinging the belt. This increases the vibration produced by the belt transmission mechanism such that a loud noise is produced.

To solve the above-described problem, the prior art has provided a drum type washing machine as shown in FIG. 15. The drum type washing machine shown in FIG. 15 comprises a water tub 2 and an electric motor 21 provided on a rear wall of the water tub 2. More specifically, a mounting member 24 is fixed on the rear wall of the water tub 2 so as to cover a bearing housing 6. The motor 21 includes a stator 23 fixed to the mounting member 24. The motor 21 also includes a rotor 22 connected to a rear end of a shaft 5 of the rotating tub. Japanese Patent Application Publication No. 9-182369 (1997) also discloses a drum type washing machine having the same construction as described above.

Torque developed by the motor 21 is directly transmitted to the shaft 5 and accordingly to the rotating tub 4 without a belt transmission mechanism in the aforesaid drum type washing machine. As a result, the construction of the driving mechanism for the rotating tub 4 is simplified and the manufacturing cost can be reduced accordingly. Furthermore, the vibration and noise can be reduced since no belt transmission mechanism is required.

Generally speaking, when a center of a stator and a center of rotation of a rotor of an electric motor are displaced relative to each other, an air gap defined between the stator and rotor is varied depending upon a rotation angle. This reduces the accuracy of the motor and produces vibration and noise. Accordingly, the center of the stator and the center of rotation of the rotor need to agree with each other with the greatest circumspection. The motor 11 as an end product is mounted on the lower portion of the water tub 2 in the conventional drum type washing machine. Accordingly, the center of the stator and the center of rotation of the rotor need not be aligned with each other regarding the motor 11.

On the other hand, the motor 21 includes a combination of the stator 23 fixed to the mounting member 24 and the rotor 22 fixed to the rear end of the shaft 5. More specifically, the center of the stator 23 and the center of rotation of the rotor 22 need to be aligned with each other. Thus, the motor 21 needs to be mounted with the greater circumspection in the aforesaid direct-drive drum type washing machine than in the aforesaid drum type washing machine with the belt transmission mechanism. Further, laundry sometimes tends to be one-sided during a dehydrating operation regarding the aforesaid drum type washing machine with the belt transmission mechanism. When the laundry becomes one-sided, the magnitude of centrifugal force acting on a portion of the rotating tub 5 differs from the magnitude of centrifugal force acting on the other portion of the rotating tub. For example, when laundry in the rotating tub 4 is one-sided at an area A shown by the two-dot chain line in FIG. 14, a large centrifugal force F1 is applied to the area A, the bearings 7 and 8 in the bearing housing 6 are subjected to loads F2 and F3 respectively.

Since bellows connect an opening side of the water tub to the outer cabinet in each of the aforesaid drum type washing machine, a supporting structure for the water tub tends to become more rigid than the one of an automatic washing machine of the vertical axis type. When a part of the rotating tub is subjected to a large centrifugal force F1 during the dehydrating operation, the loads F2 and F3 acting on the respective bearings 7 and 8 are increased such that the bearing housing 6 and parts around the bearing housing would be deformed. In the drum type washing machine shown in FIG. 14, the motor 11 is not almost affected by the loads F2 and F3 both acting on the bearing housing 6 since the motor is mounted on the lower portion of the water tub 2. More specifically, the motor 11 is subjected to no large force other than the tension F4 of the belt 14.

On the other hand, the stator 23 is fixed on the mounting member 24 surrounding the bearing housing 6 in the drum type washing machine shown in FIG. 15. Accordingly, the stator 23 is easy to be affected by the loads F2 and F3. The positional relation between the rotor 22 and the stator 23 changes when the bearing housing 6 and the mounting member 24 are deformed by the loads F2 and F3. As a result, the center of the stator 23 and the center of rotation of the rotor 22 are displaced relative to each other.

Furthermore, in the drum type washing machines, a washing/dehydrating capacity and a rotational speed in the dehydrating operation differ from one type to another. In the case of a drum type washing machine having a large washing/dehydrating capacity, the size of the rotating tub 4 is increased and a larger amount of laundry is accommodated in the rotating tub. Thus, the washing machine of the large capacity type requires a larger drive torque than that of the small capacity type. Further, the washing machine with a high rotational speed for the dehydrating operation requires a higher durability of the shaft 5 than that with a low rotational speed for the dehydrating operation. Accordingly, the diameter of the shaft 5 tends to be increased.

In view of the above-described problem, the construction of the connection between the shaft 5 and the driven pulley 9 or between the shaft 5 and the rotor 22 needs to be changed according to the washing capacity, the dehydrating capacity or the rotational speed in the dehydrating operation. The construction of the connection between the shaft 5 and the driven pulley 9 is changed in the following manner. The driven pulley 9 is die-cast from aluminum and accordingly, the construction can easily be changed by cutting a portion of the driven pulley 9 connected to the shaft 5. On the other hand, when the shaft 5 and the rotor 22 are cut so that the construction of the connection between them is changed, there is a possibility that the center of the stator 23 and the center of rotation of the rotor 22 may be displaced relative to each other. As a result, the air gap defined between the stator and rotor is varied such that the accuracy of the motor is adversely affected. Consequently, the construction of the connection between the shaft 5 and the rotor 22 cannot easily be changed in the drum type washing machine of the direct drive type.

SUMMARY OF THE INVENTION

Therefore, an object of the present invention is to provide a drum type washing machine wherein an electric motor is provided on a rear wall of the water tub for directly driving the rotating tub and the center of rotation of the rotor and the center of the stator can easily be aligned with each other.

The present invention provides a drum type washing machine comprising an outer cabinet, a water tub mounted in the outer cabinet and having a rear end plate, a generally drum-shaped rotating tub rotatably mounted in the water tub and having a rear wall, a rotating tub shaft provided on a center of the rear wall of the rotating tub and having a rear end projecting rearward to be located in the rear of the rear end plate of the water tub, an electric motor provided for rotating the rotating tub via the rotating tub shaft, the motor including a stator provided on the rear end plate of the water tub and a rotor connected to the rear end of the rotating tub shaft, a bearing housing provided on the rear end plate of the water tub and having a bearing element supporting the rotating tub shaft so that the rotating tub shaft is rotatable, and an aligning structure for aligning a center of rotation of the rotor and a center of the stator.

According to the above-described construction, the center of rotation of the rotor and the center of the stator can reliably be aligned with each other even though the stator is provided on the rear end plate of the water tub and the rotor is connected to the rear end of the rotating tub shaft. Consequently, the rotor and the stator can be mounted easily.

In a preferred form, the aligning structure includes a positioner formed integrally on an outer periphery of the bearing housing for radially positioning the stator. The position of the stator relative to the bearing housing can be prevented from being changed even when the bearing housing is subjected to load such that the bearing housing and the parts around the bearing housing are deformed. In other words, the position of the stator relative to the rotating tub shaft supported on the bearing housing and accordingly the rotor can be prevented from being changed. Consequently, the center of rotation of the rotor and the center of the stator are prevented from being deviated from each other and the dimension of the air gap between the stator and the rotor can be prevented from being deviated.

In another preferred form, the stator is fixed to the bearing housing. Since the positioner and the stator are mounted on the same member, the stator can be positioned accurately. Furthermore, the positioner preferably includes an abutting portion abutting against the stator radially outward, and the abutting portion has an axial dimension equal to or larger than an axial dimension of the stator. The abutting portion of the positioner can be caused to abut against the stator even when the axial position of the stator is slightly shifted.

In further another preferred form, the motor is of an outer rotor type, and the stator has such a generally annular shape as to surround the bearing housing. In this case, the stator has an inner circumferential face formed with an inwardly extending protrusion, and the positioner is constructed so as to abut against the protrusion. Alternatively, the positioner is formed into such a generally convex shape as to outwardly extend such that the protrusion abuts against the inner circumferential face of the stator. In each construction, the stator can easily be radially positioned.

In further another preferred form, the drum type washing machine further comprises a reinforcement for reinforcing the rear end plate of the water tub. In this case, the bearing housing is formed integrally with the reinforcement, and the positioner is disposed on the outer periphery of the bearing housing so as to align with the reinforcement. Consequently, the strength of the positioner can be improved.

In further another preferred form, the aligning structure includes a connecting member connecting the rotor and the rotating tub shaft to each other. Consequently, the construction of the connection between the rotor and the rotating tub shaft can be changed only by changing the construction of the connecting member. Consequently, the center of rotation of the rotor and the center of the stator can be prevented from being deviated from each other. The connecting member preferably includes a rotor connecting member mounted to the rotor and a shaft connecting member mounted to the rotating tub shaft. In this case, the rotor connecting member is formed on the rotor by an insert molding method, and the shaft connecting member is press fitted in the rotating tub shaft. Even when the rotor and the rotating tub shaft are connected by the rotor and shaft connecting members, a decrease in the strength of each connection can be prevented.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
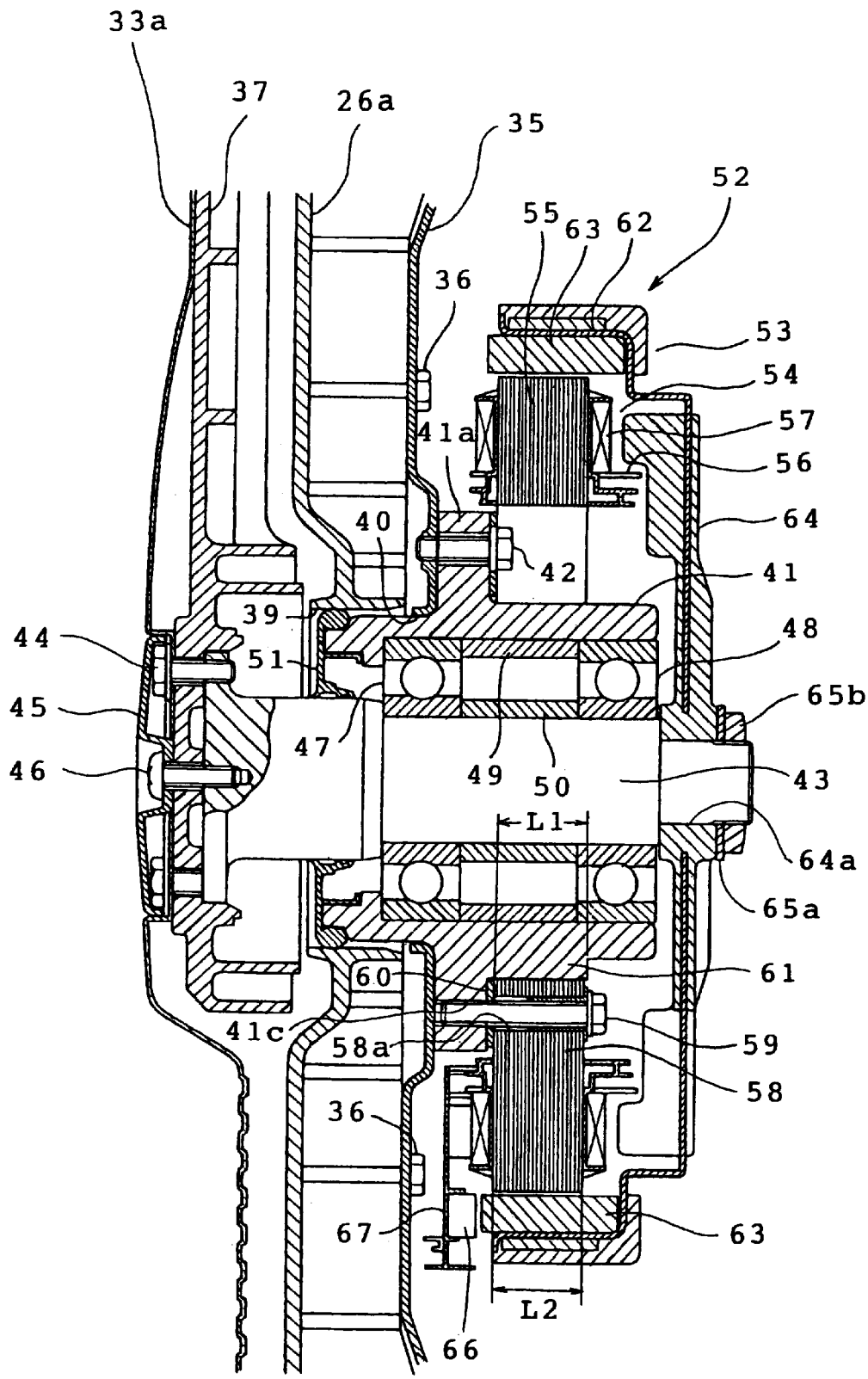
FIG. 1 is an enlarged longitudinally sectional side view of an electric motor used in the drum type washing machine of a first embodiment in accordance with the present invention.
Figure 2:
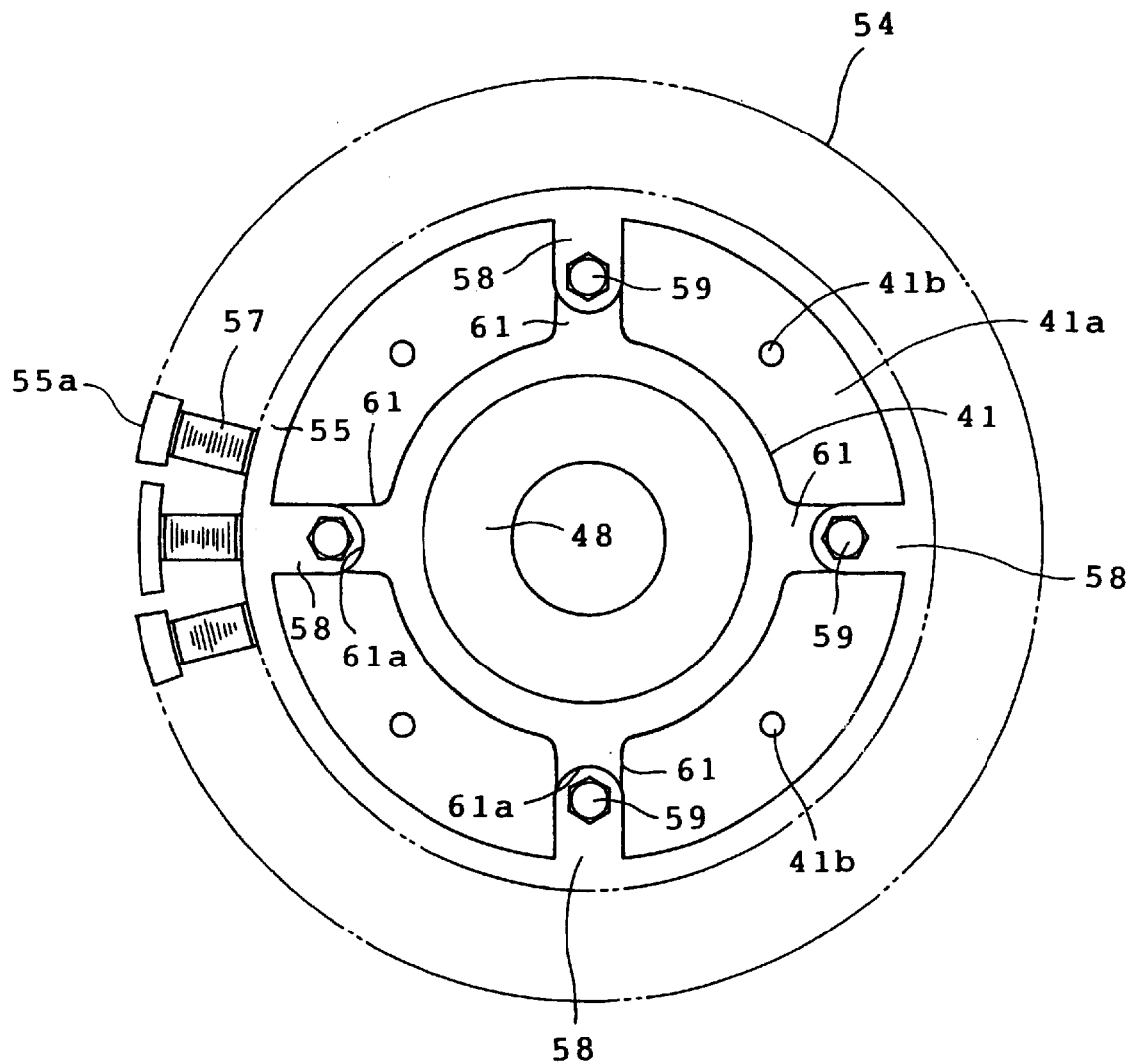
FIG. 2 is a rear view of a bearing housing and a stator with a rotor being removed.
Figure 3:
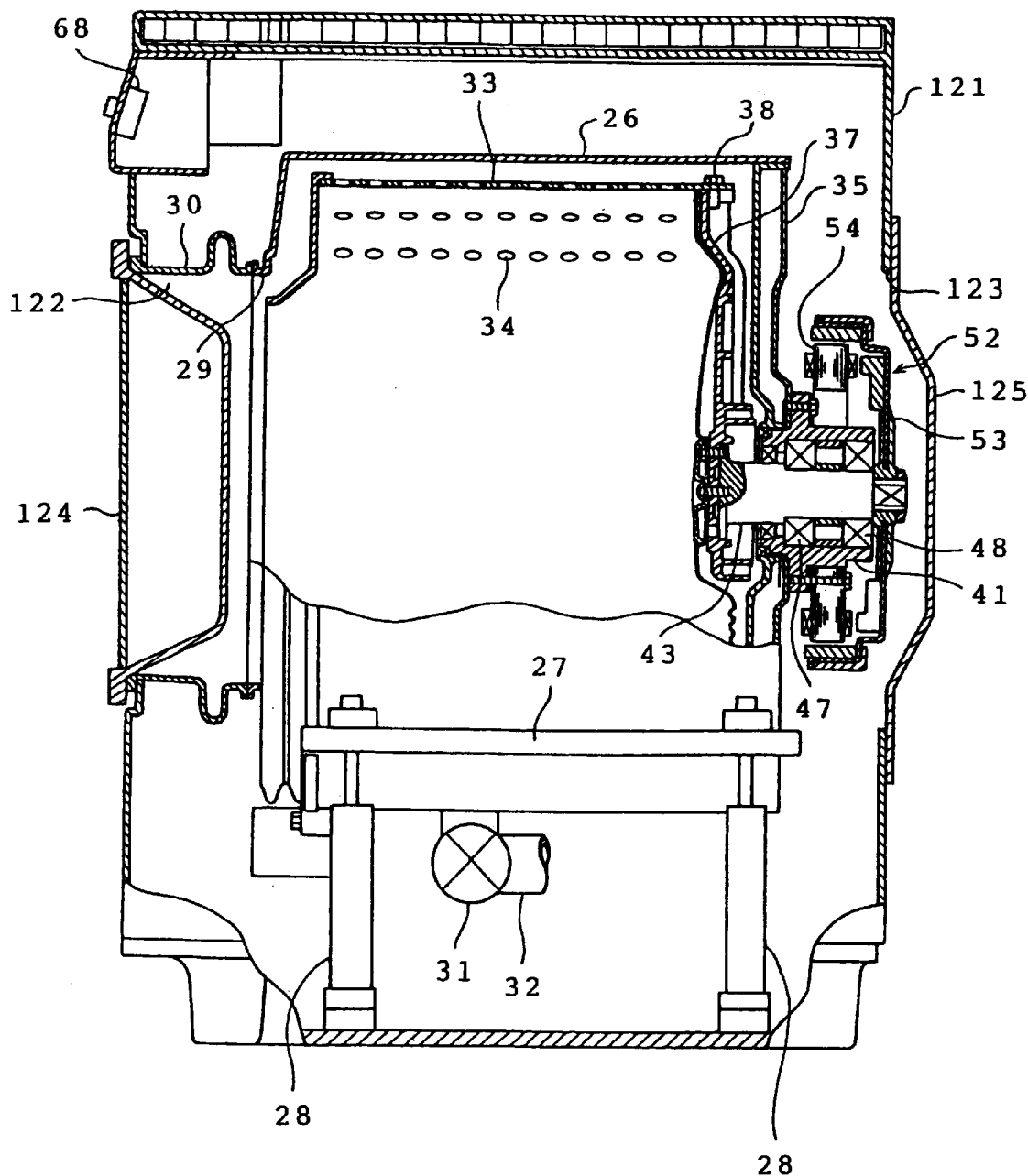
FIG. 3 is a longitudinally sectional side view of the drum type washing machine.

A first embodiment of the present invention will be described with reference to FIGS. 1 to 4. Referring first to FIG. 3, a drum type washing machine of the first embodiment in accordance with the invention is shown. The shown drum type washing machine has a drying function. The washing machine comprises a generally rectangular outer cabinet 121 having a front wall formed with a central access opening 122 through which laundry is put into and taken out of a rotating tub 33 which will be described in detail later. A door 124 is pivotally mounted on the front wall of the outer cabinet 121. The outer cabinet 121 has a rear wall with a centrally formed working opening 123. A back panel 125 is detachably mounted on the rear wall of the cabinet 121 by screws (not shown) so as to close the working opening 123.

A cylindrical water tub 26 made of a synthetic resin is enclosed in the outer cabinet 121. The water tub 26 is supported on a pair of support plates 27 (one of them being shown) which are elastically supported on a plurality of, for example, four suspension mechanisms 28 two of which are shown in FIG. 3. The water tub 26 has a front wall with a central opening 29. Bellows 29 are provided for connecting the access opening 22 and the opening 29 to each other. The water tub 26 has a drain hole (not shown) formed through the bottom thereof. A drain valve 31 is connected to the drain hole, and a drain hose 32 is connected to the drain valve.

A drum-shaped rotating tub 33 is rotatably mounted in the water tub 26. The rotating tub 33 is made of a metal such as a stainless steel and functions as a wash tub, dehydration tub and drying drum. The rotating tub 33 has a generally horizontal axis of rotation. The rotating tub 33 has a number of small through holes 34 through which water and air are caused to flow.

A drive mechanism for rotating the rotating tub 33 will now be described with reference to FIG. 1. The water tub 26 has a rear end plate 26a to which a generally circular reinforcing plate 35 is secured by a plurality of bolts 36 two of which are shown in FIG. 1. The reinforcing plate 35 is made of a metal such as a stainless steel. The rear end plate 26a and the reinforcing plate 35 constitute a rear wall of the water tub 26. The rotating tub 33 has a rear end plate 33a to which a metal drum support 37 is secured by a plurality of bolts 38 one of which is shown in FIG. 3. The drum support 37 has a larger thickness than the rear end plate 33a and serves as a reinforcing plate for the rear end plate 33a as well as a support for the rotating tub 33. The rear end plate 26a of the water tub 26 and the reinforcing plate 35 have two centrally formed housing insertion holes 39 and 40 respectively.

A front end portion of a cylindrical bearing housing 41 made of aluminum is inserted into the holes 39 and 40 in turn. The bearing housing 41 includes an outer periphery on which a mounting flange 41a is formed integrally. The flange 41a has, for example, four bolt insertion holes 41b (see FIG. 2) through which bolts 42 are inserted and further screwed into the reinforcing plate 35 respectively so that the reinforcing plate 35 is fixed to a rear face of the rear end plate 26a of the water tub 26. The flange 41a further has, for example, four screw holes 41c as shown in FIG. 1. The bearing housing 41 has four radially extending positioning protrusions 61 formed on the rear of the flange 41a of the outer circumference thereof as shown in FIG. 2. The positioning protrusions 61 assume circumferential positions corresponding to the screw holes 41c respectively. The protrusions 61 serve as positioners and extend rearward from the rear face of the flange 41a. Each protrusion 61 has a recessed radial end face 61a.

The bearing housing 41 encloses outer and inner collars 49 and 50 and two ball bearings 47 and 48 fitted between the collars as shown in FIG. 1. A rotating tub shaft 43 is rotatably mounted on the ball bearings 47 and 48. A sealing member 51 is fitted in the housing insertion hole 39 of the water tub 26 so as to be located at the front end of the bearing housing 41. This provides a watertight sealing between the rear end plate 26a of the water tub 26 and the rotating tub shaft 43. The rotating tub shaft 43 has a front end secured to the central portions of the rear end plate 33a of the rotating tub 33 and the rotating tub support 37 by a plurality of bolts 44 one of which is shown in FIG. 2. A cap 45 is mounted by a screw 46 on the central rear end plate 33a of the rotating tub 33 to cover heads of the bolts 44.

Figure 4:
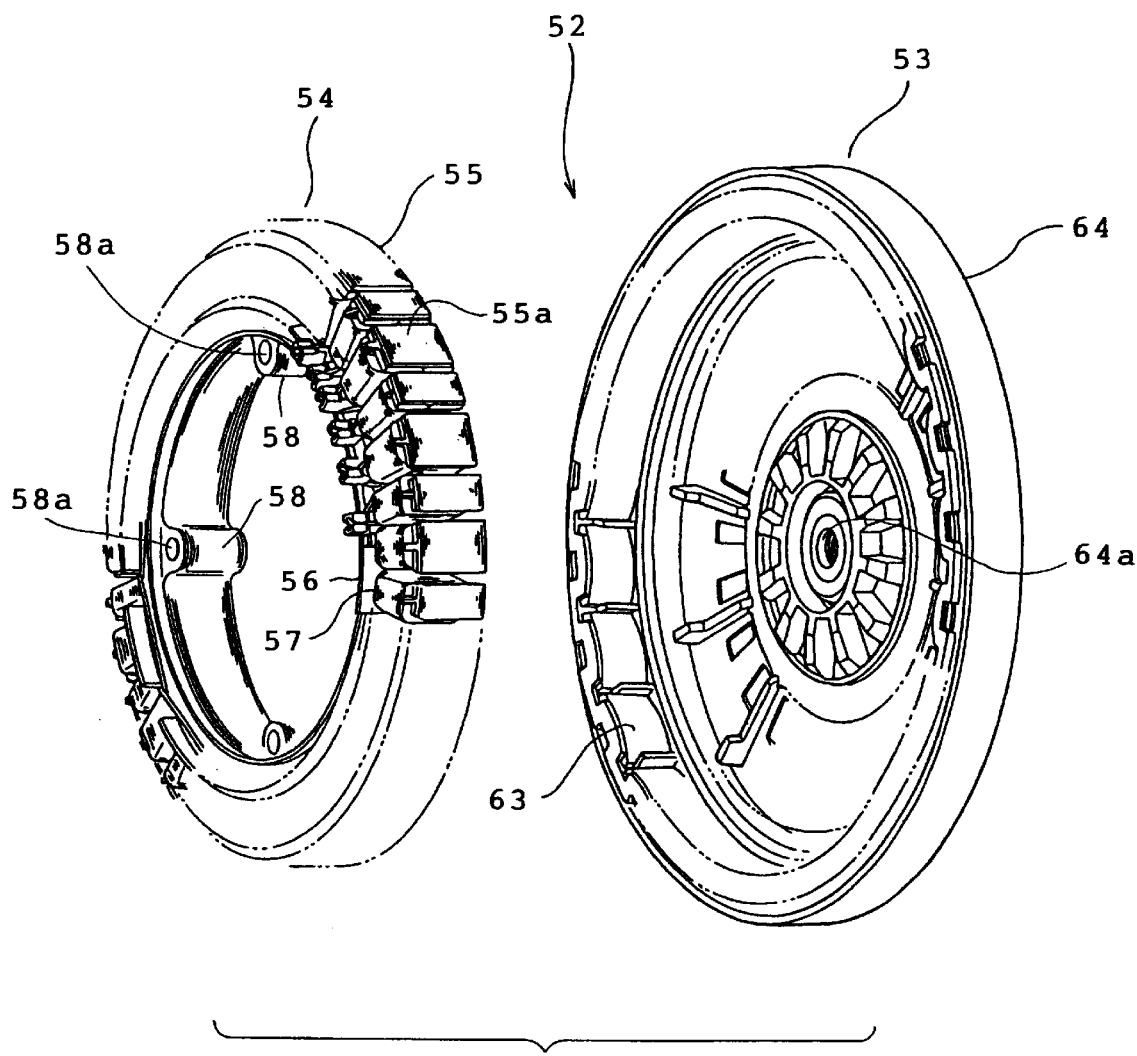
FIG. 4 is an exploded perspective view of the motor.

A brushless dc motor 52 is provided on the rear of the water tub 26. The brushless motor 52 is of the outer rotor type in which a rotor is disposed outside a stator. The motor 52 includes a stator 54 including a stator core 55 made of a stack of laminated steel sheets and a winding 57 wound on bobbins 56 provided on teeth 55a protruding outward from an outer circumference of the stator 55, as shown in FIG. 4. The stator core 55 has, for example, four protrusions 58 formed integrally on the inner circumference thereof and having bolt insertion holes 58a respectively. The protrusions 58 are disposed so as to correspond to the positioning protrusions 61 respectively.

The bolt insertion holes 58a are aligned with the screw holes 41c respectively when the stator 54 is fixed to the mounting flange 41a of the bearing housing 41, as shown in FIGS. 1 and 2. In this state, bolts 59 are inserted through the holes 58a and screwed into the screw holes 41c, respectively. In this case, the distal ends of the protrusions 58 are fitted with the end faces 61a of the positioning protrusions 61 such that the distal ends are in abutment with the protrusions, respectively. The end faces 61a thus serve as abutment portions of the positioning protrusions 61 respectively. Each end face 61a has an axial dimension L1 set to be slightly larger than an axial dimension L2 of the stator core 55. A thin insulating plate 60 is provided between the flange 41a and the stator core 55. The stator core 55 is located substantially in the axial middle of the bearing housing 41.

The rotor 53 is formed into the shape of a shallow container as shown in FIGS. 1 and 4. The rotor 53 includes a rotor housing 64 and a number of rotor magnets 63 secured on a circumferentially inside of the rotor housing. The rotor housing 64 is formed by an insert molding method wherein the rotor housing is made of a synthetic resin around a metal frame 62 which also serves as a rotor yoke. The rotor housing 64 has a central hole 64a formed through its central rear end. A rear end of the rotating tub shaft 43 is fitted in the hole 64a. A serration (not shown) engages an inner circumferential face of the hole 64a and an outer circumferential face of the shaft 43 therebetween. A washer 65a is mounted on a portion of the shaft 43 protruding rearward relative to the opening 64a, and a nut 65 is then tightened up onto the portion of the shaft 43. As a result, the shaft 43 and the rotor 53 are rotated together.

A circuit board 67 is mounted on a front portion of the stator core 55. The circuit board 67 serves as a mounting plate as well as serving to carry various electrical components or the like, as shown in FIG. 1. A rotation sensor 66 is mounted on the circuit board 67 for detecting rotation of the rotating tub 33. The sensor 66 comprises one or more Hall IC's, for example, and is disposed opposite the rotor magnets 63.

A control device 68 is provided in an upper front interior of the outer cabinet 121 as shown in FIG. 3. The control device 68 comprises a microcomputer-based circuit and stores a control program for controlling an overall operation of the washing machine. Further, the control device 68 detects an amount of laundry accommodated in the rotating tub 33, and a degree of unbalance of the laundry based on the results of detection by the rotation sensor 66. Additionally, a blower, dehumidifier, and dryer such as a heater are provided in the outer cabinet 121 although none of them are shown.

The motor 52 is energized so that the rotor 53 thereof is rotated. Upon rotation of the rotor 53, the rotating tub shaft 43 and the rotating tub 33 are rotated therewith. In other words, torque developed by the motor 52 is directly transmitted to the shaft 43 and the tub 33. Consequently, the vibration and noise due to drive of the motor 52 can be reduced. Particularly in the foregoing embodiment, the positioning protrusions 61 are provided around the outer circumference of the bearing housing 41. Accordingly, the stator 54 is radially positioned when mounted on the flange 41a of the bearing housing 41. Consequently, the center of rotation of the rotor 53 or the center of the shaft 43 and the center of the stator 54 can reliably be aligned with each other.

The laundry sometimes becomes one-sided during the dehydrating operation such that the magnitude of a centrifugal force acting on the rotating tub 33 disperses, whereupon the shaft 43 is slightly displaced. Even in such a case, the relative positional relation between the stator 54 and the shaft 43 remains unchanged since the stator 54 is fixed on the bearing housing 41. Consequently, disalignment between the centers of the stator 54 and the shaft 43 can be prevented and accordingly, deviation of the air gap between the rotor 53 and the stator 54 can be prevented.

In a drum type washing machine with a drying function, it is desired that the rotational speed of the rotating tub should be increased in the dehydrating operation for the purpose of reducing the time required for the drying operation. The vibration and noise due to the disalignment between the center of the stator and the center of rotation of the rotor become more conspicuous as the rotational speed of the motor is increased. Accordingly, the above-described construction preventing the disalignment between the center of the stator and the center of rotation of the rotor becomes more effective when the rotational speed in the dehydrating operation is further increased.

The axial dimension L1 of the end face 61a of each positioning protrusion 61 is slightly larger than the axial dimension L2 of the stator core 55. Accordingly, even if the stator 54 is slightly displaced axially, the end faces 61a of the positioning protrusions 61 abut against the protrusions 58 respectively, whereupon the stator 54 can stably be supported. Consequently, the positional relation between the stator 54 and the rotating tub shaft 43 can further be prevented from changing. Moreover, the bearing housing 41 has the mounting flange 41a for fixing the stator 54 and the positioning protrusions 61 for positioning the stator 54. Consequently, the disalignment between the center of the stator 54 and the shaft center of the rotating tub shaft 43 can further be prevented as compared with a case where the flange 41a and the protrusions 61 are provided on different members.

Figure 5:
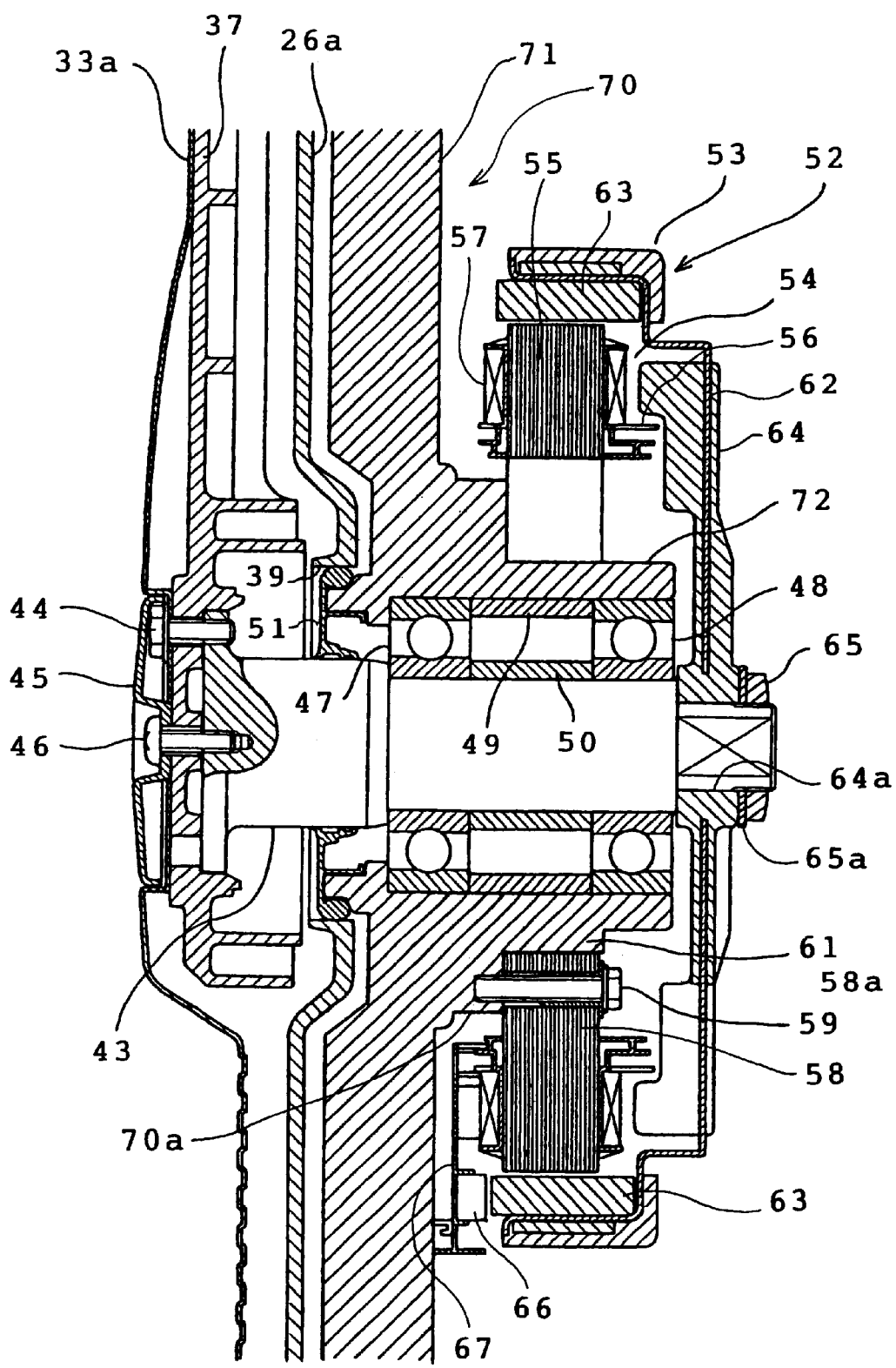
FIG. 5 is a view similar to FIG. 1, showing the motor used in the drum type washing machine of a second embodiment in accordance with the invention.

FIG. 5 illustrates a second embodiment of the invention. Only the difference between the first and second embodiments will be described. The identical or similar parts in the second embodiment are labeled by the same reference symbols as those in the first embodiment. In the second embodiment, a reinforcement 70 is secured to the rear wall 26a of the water tub 26, instead of the reinforcing plate 35. The reinforcement 70 is made of aluminum by forming an annular reinforcing plate 71 integrally with the bearing housing 72, for example. In this case, a portion of the reinforcing plate 71 adjacent to the bearing housing 72 has a larger thickness than the other portion of the reinforcing plate and serves as a mounting portion 70a for the stator 54. The positioning protrusions 61 are formed on the outer circumference of the bearing housing 72 in the rear of the mounting portion 70a. More specifically, the rear face of the reinforcing plate 71, mounting portion 70a and protrusions 61 are contiguous to one another. Accordingly, the strength of each protrusion 61 can be increased. Furthermore, since the reinforcing plate 71 is formed integrally with the bearing housing 72, the number of components can be reduced and accordingly, the number of assembling steps can be reduced.

The other construction of the drum type washing machine of the second embodiment is the same as that in the first embodiment. As a result, the same effect can be achieved from the second embodiment as from the first embodiment.

Figure 6:
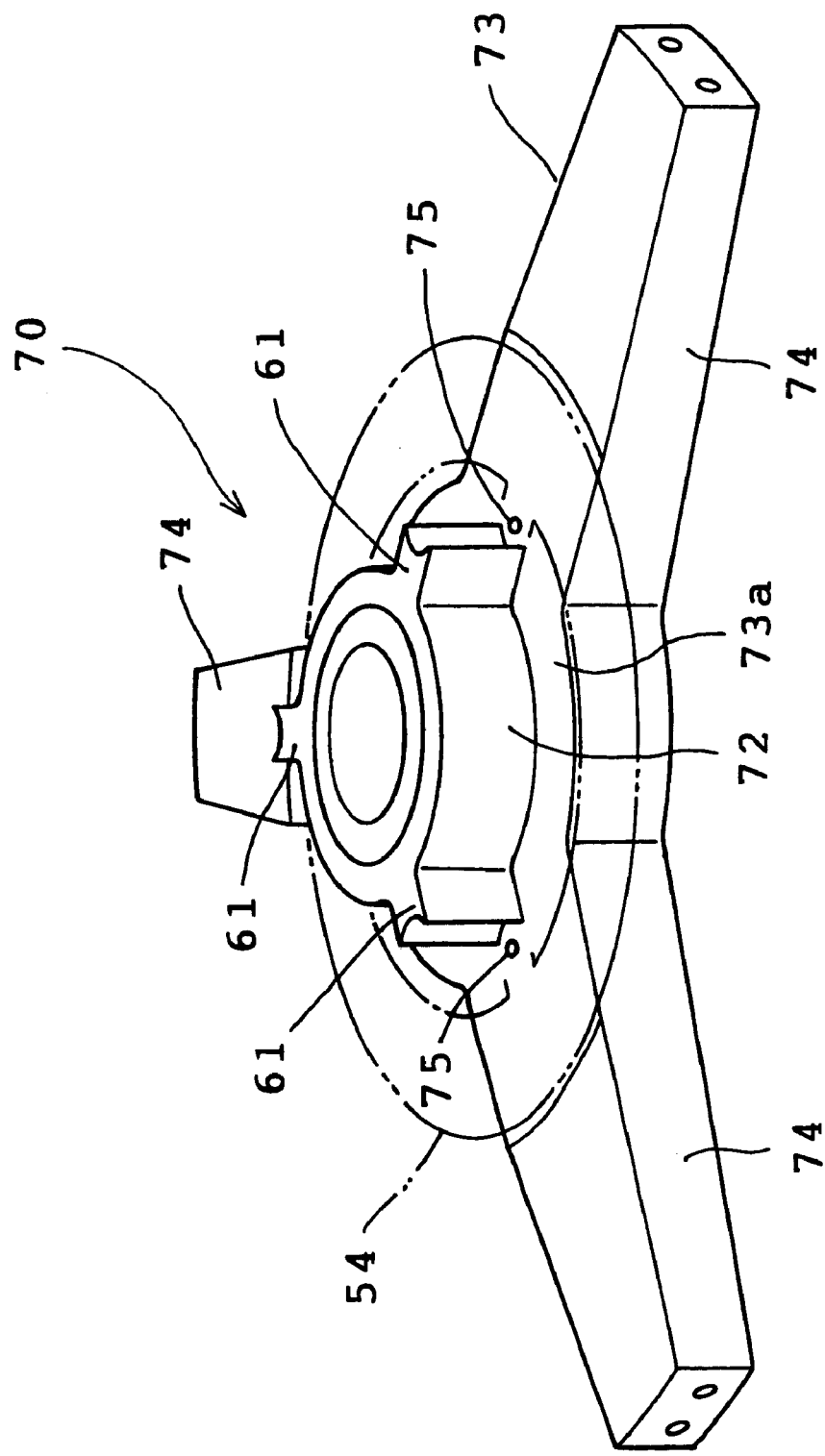
FIG. 6 is a perspective view of a reinforcement used in the drum type washing machine of a third embodiment in accordance with the invention.

FIG. 6 illustrates a third embodiment of the invention. The third embodiment differs from the second embodiment in the construction of the reinforcement 70. The reinforcement 70 includes a reinforcing member 73 and the bearing housing formed integrally with the reinforcing member. The reinforcing member 73 includes a central disc 73a and three arms 74 extending radially from the disc. Each arm 74 has a distal end which is to be fixed to the water tub 26. Each arm 74 has a mounting hole 75 formed in a proximal end thereof for the mounting of the stator 54. The outer circumference of the bearing housing 72 has three positioning protrusions 61 corresponding to the mounting holes 75 respectively. The stator 54 has three protrusions 58 (not shown) formed to correspond to the mounting holes 75 respectively. When the stator 54 is mounted on the reinforcement 70, the bolt insertion holes 58a of the protrusions 58 are caused to agree with the mounting holes 75 respectively, and the bolts 59 are inserted through the insertion holes 58a and screwed into the mounting holes 75, respectively.

The stator 54 is mounted on the reinforcement 70 so as to be disposed as shown by two-dot chain line in FIG. 6. A portion of the reinforcement 70 against which the front face of the stator 54 abuts is flat. A portion of each arm 74 located outside the stator 54 has a thickness gradually reduced toward the distal end. The weight of the reinforcement 70 can be reduced since the reinforcement 70 includes the reinforcing member 73 having the three arms 74, instead of the reinforcing plate 71.

Figure 7:
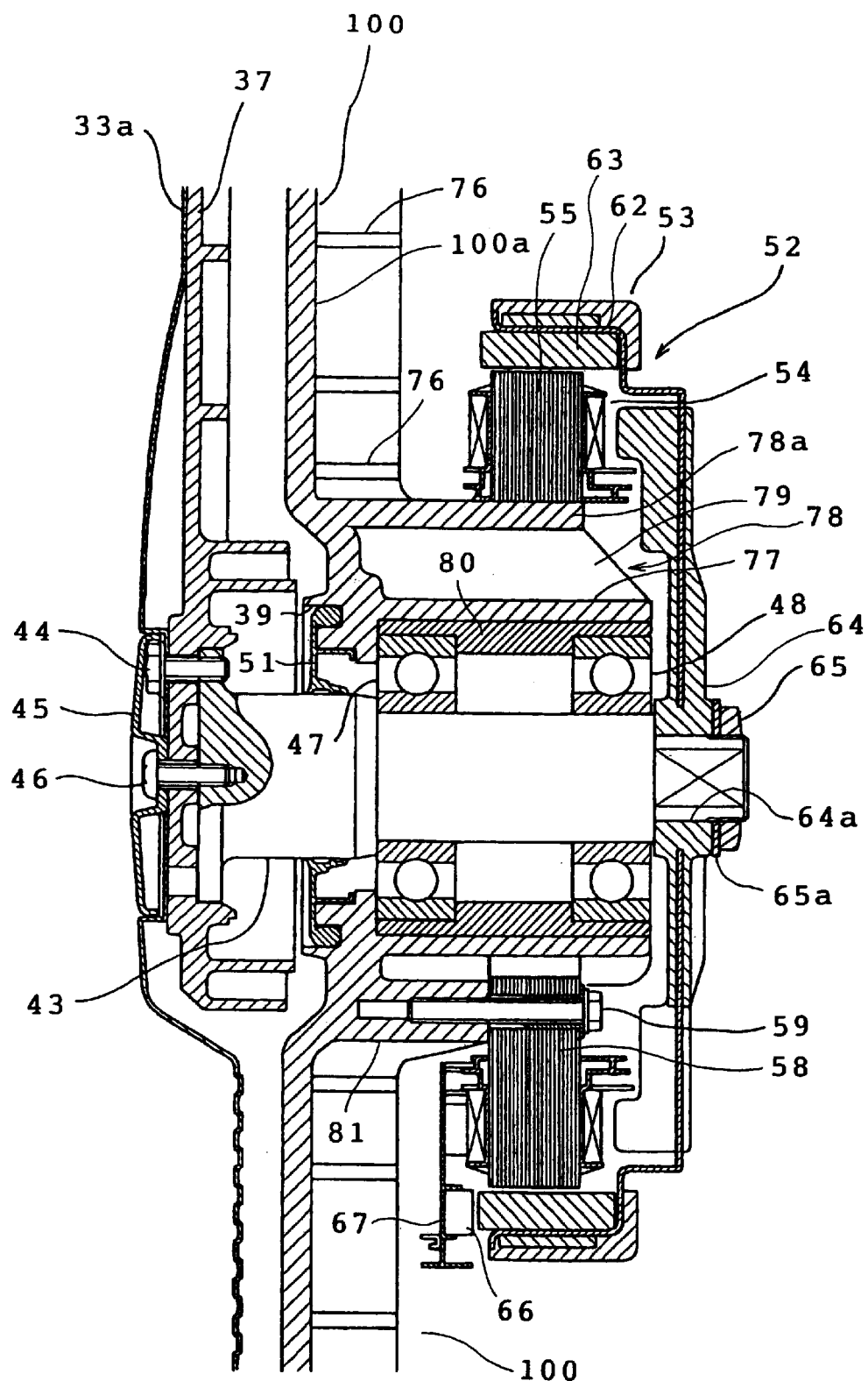
FIG. 7 is a view similar to FIG. 1, showing the motor used in the drum type washing machine of a fourth embodiment in accordance with the invention.
Figure 8:
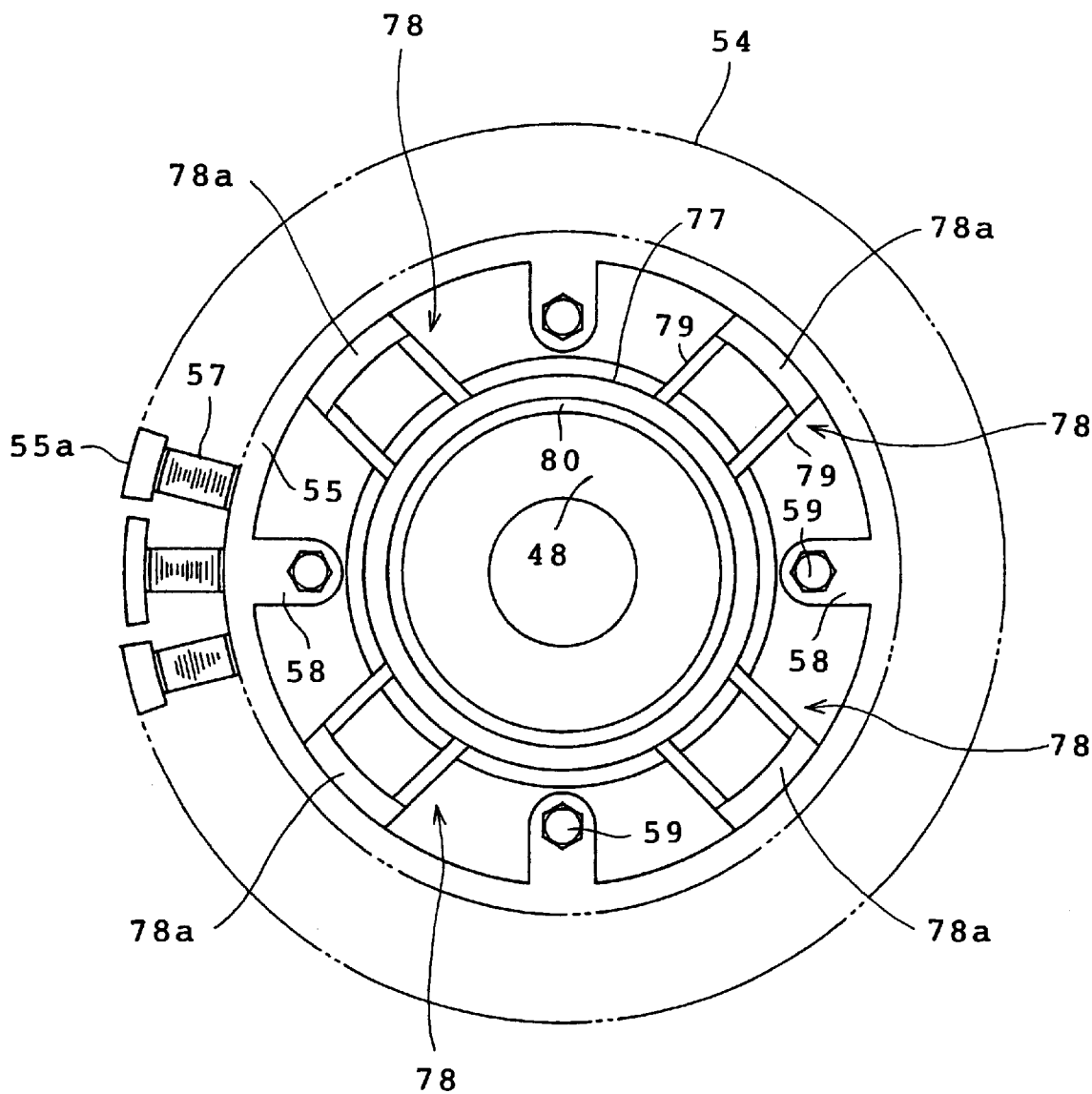
FIG. 8 is a view similar to FIG. 2.

FIGS. 7 and 8 illustrate a fourth embodiment of the invention. The difference between the first and fourth embodiments will be described. A water tub 100 is provided in the fourth embodiment, instead of the water tub 26. The water tub 100 includes a rear end plate 100a having reinforcing ribs 76 for reinforcing the rear end plate. The reinforcing ribs 76 are formed of a synthetic resin integrally with the bearing housing 77. The rear end plate 100a and the ribs 76 constitute a rear wall of the water tub 100. For example, four bosses 81 are formed on the rear side of the rear end plate 100a so as to be located around the bearing housing 77. The bolts 59 are inserted through the insertion holes 58a of the protrusions 58 and then screwed into the bosses 81, respectively, so that the stator 54 is fixed to the rear wall of the water tub 75.

For example, four positioners 78 are formed integrally on the outer circumference of the bearing housing 77. Each positioner 78 includes an abutment face 78a and two ribs 79 connecting the abutment face 78a to the outer circumference of the bearing housing 77. When the stator 54 is fixed to the rear wall of the water tub 75, the abutment faces 78a abut against the inner periphery of the stator core 55, whereby the stator 54 is axially positioned. Furthermore, the bearing housing 77 has a bearing case 80 provided on the inner circumference of the bearing housing 77 by an insert molding method. The ball bearings 47 and 48 are previously press-fitted in the bearing case 80.

According to the fourth embodiment, the number of assembling steps can further be reduced since the number of components is further decreased. Moreover, the reinforcing ribs 76 reinforcing the rear end plate 100a of the water tub 100 is made of the synthetic resin. Consequently, a further reduction in the weight of the water tub 100 can be achieved.

FIGS. 9 to 13 illustrate a fifth embodiment of the invention. The differences between the first and fifth embodiments will be described. The positioning protrusions 61 are eliminated in the fifth embodiment. In this case, however, the positions of the bolt insertion holes 58a and screw holes 41c are precisely set such that the stator 54 can be positioned axially.

Figure 9:
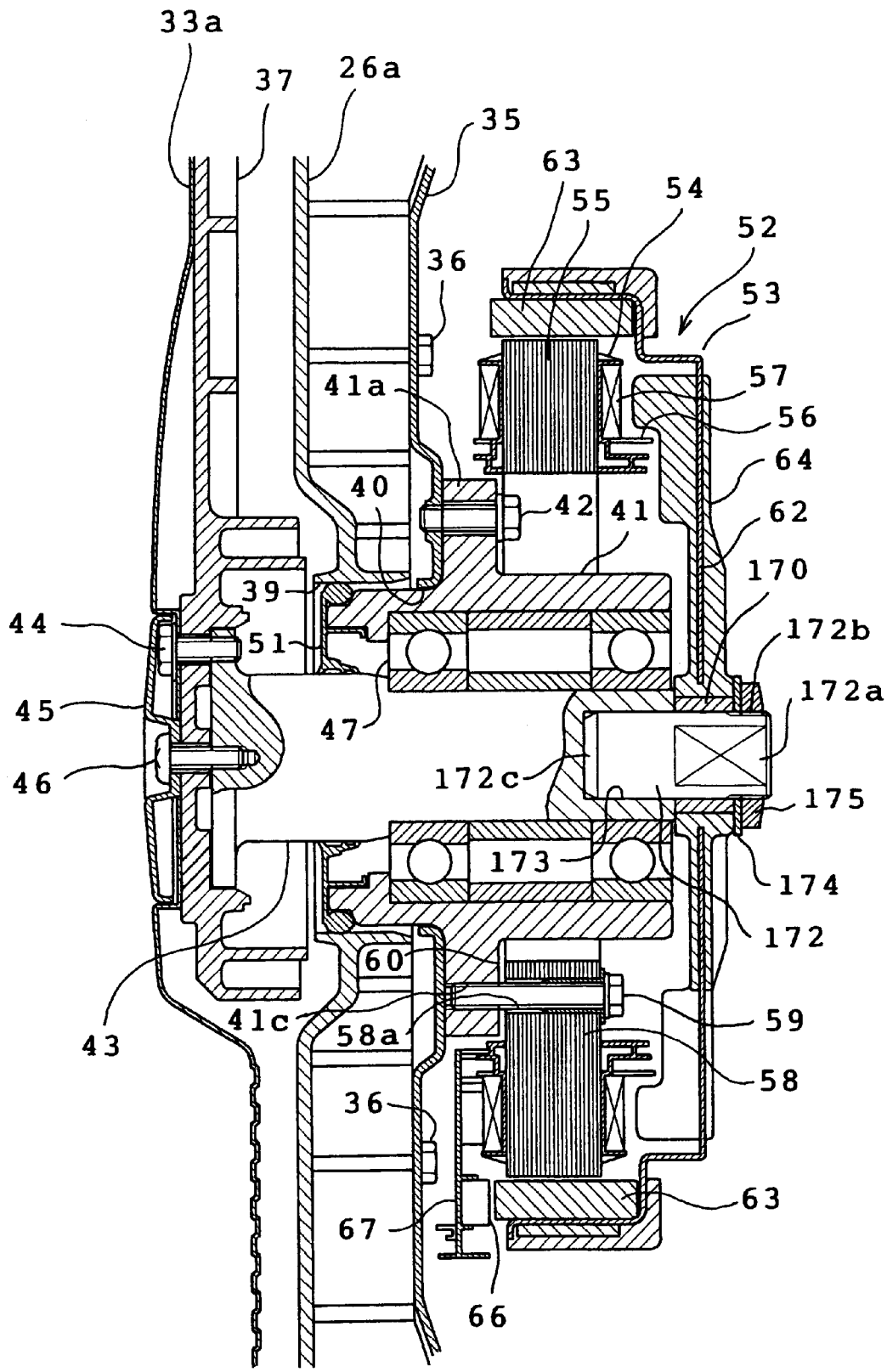
FIG. 9 is a view similar to FIG. 1, showing the motor used in the drum type washing machine of a fifth embodiment in accordance with the invention.
Figure 10:
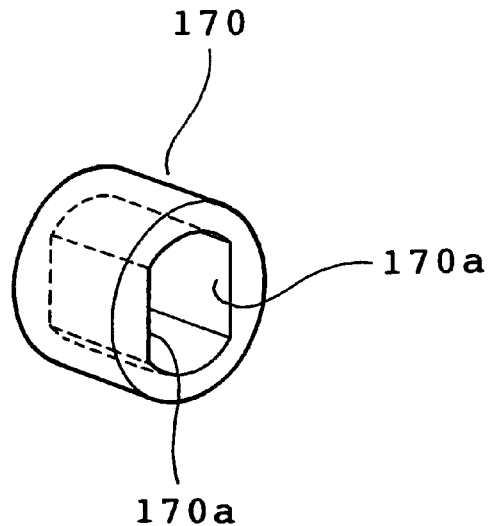
FIG. 10 is an enlarged perspective view of a rotor connecting member.
Figure 11:
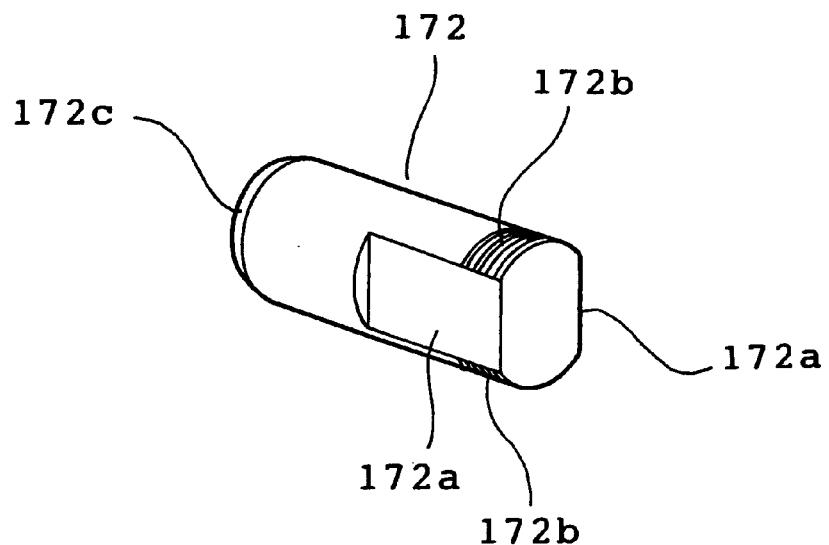
FIG. 11 is an enlarged perspective view of a shaft connecting member.

The connecting structure for the rotor 53 and the shaft 43 differs from that in the first embodiment. More specifically, the rotor housing 64 includes a frame 62 and a metal connecting member 170 both formed by the insert molding method. The connecting member 170 is disposed on the center of the frame 62. The connecting member 170 is formed generally into a cylindrical shape and has two opposite flat faces 170a formed on an inner circumference thereof, as shown in FIG. 10. The rotating tub shaft 43 has a hole 173 formed in the rear end thereof as shown in FIG. 9. A generally solid cylindrical metal receiving member 172 has a first or one tapered end 172c press fitted in the hole 173 as shown in FIG. 11. Since the first end 172c is tapered, the receiving member 172 is easy to be press fitted into the hole 173. Further, the receiving member 172 has a second or the other end formed with two opposite flat faces 172a. A male screw portion 172b is formed on a portion of the receiving member 172 other than the flat faces 172a.

The connection between the rotor 53 and rotating tub shaft 43 will now be described. The connecting member 170 is fitted with the receiving member 172 so that the flat faces 172a are mated with the flat faces 170a respectively. A nut 175 is tightened up together with a washer 174 onto the male screw portion 172 projecting in the rear of the connecting member 170, whereupon the rotor 53 is connected to the rotating tub shaft 43. The connecting member 170 and receiving member 172 serve as connectors respectively. Particularly the connecting member 170 serves as a rotor connecting member and the receiving member 172 serves as a shaft connecting member.

Figure 12A:
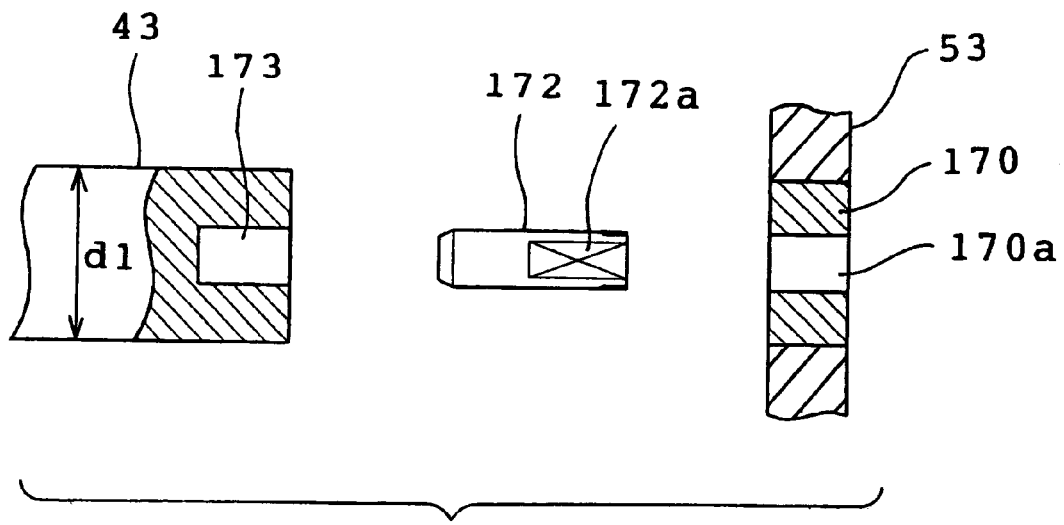
FIG. 12A illustrates a power transmission mechanism in the drum type washing machine with a small washing capacity and a small dehydrating capacity.

Referring to FIGS. 12A to 13C, the construction of the power transmission mechanism between the motor 52 and the rotating tub 33 will be altered in the following manner. The transmission mechanism includes the connecting member 170, receiving member 172 and rotating tub shaft 43 and is changed according to a washing/dehydrating capacity or a rotational speed in the dehydrating operation. FIG. 12A illustrates a power transmission mechanism in a drum type washing machine with a small washing/dehydrating capacity. FIG. 12B illustrates a power transmission mechanism in a drum type washing machine with a large washing/dehydrating capacity. It is assumed that these drum type washing machines are set at the same rotational speed in the dehydrating operation. Accordingly, outer diameters of the rotating tub shafts 43 of the machines are set at d1.

Figure 12B:
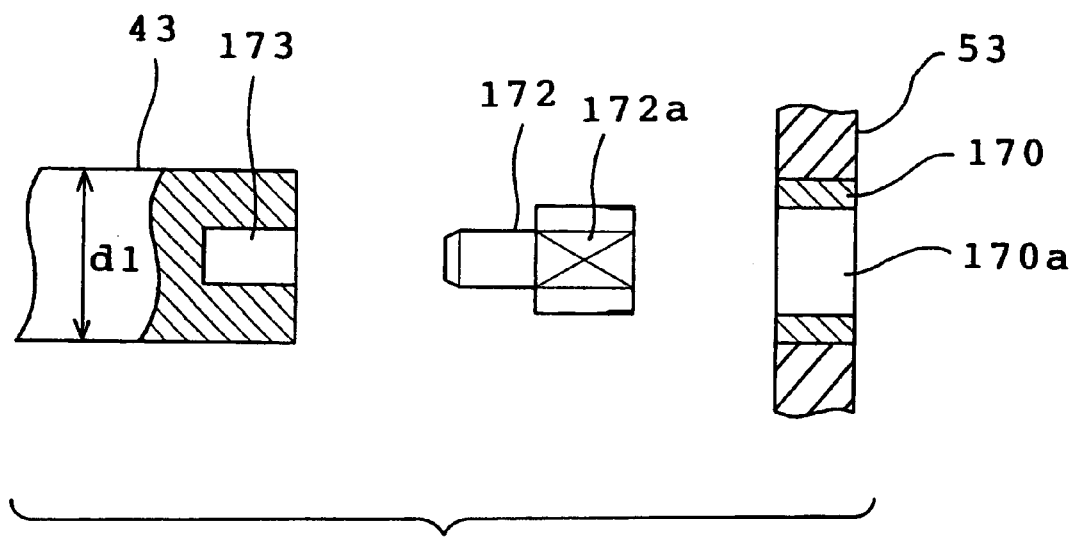
FIG. 12B illustrates a power transmission mechanism in the drum type washing machine with a large washing capacity and a large dehydrating capacity.

As shown in FIGS. 12A and 12B, the machines differ from each other in the construction of the connecting member 170 and receiving member 172. More specifically, the washing machine of the large capacity has larger flat faces 170a and 172a of the connecting and receiving members 170 and 172 than that of the small capacity. The reason for this is that since the washing machine of the large capacity requires a larger drive torque than that of the small capacity, a portion of the power transmission mechanism between the rotor 53 and the shaft 43 needs to be rendered large.

In the embodiment, the inner diameter of the connecting member 170 is changed so that the size of the flat face 170a is changed. In the two types of washing machines, the connecting members 170 are set at the same outer diameter. Further, the outer diameter of the other end of the receiving member 172 is changed so that the size of the flat face 172a is changed. In the two types of washing machines, the receiving members 172 are set at the same outer diameter of said one ends thereof. Accordingly, when the construction of the power transmission mechanism is changed according to the washing/dehydrating capacity, the connecting member 170 and the receiving member 172 may be changed so as to have the flat faces 170a and 172a having different sizes. Thus, the construction of the shaft 43 and the construction of the rotor housing 64 other than the connecting member 170 need not be changed.

Figure 13A:
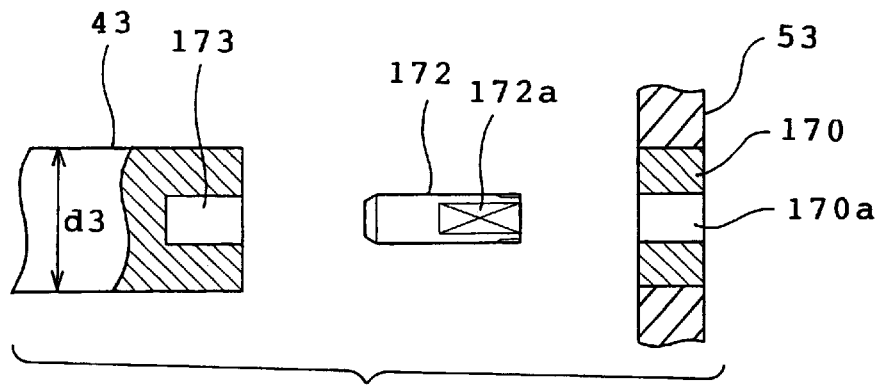
FIG. 13A illustrates a power transmission mechanism in the drum type washing machine in which the rotational speed of the rotating tub in the dehydrating operation is set at a low speed.
Figure 13B:
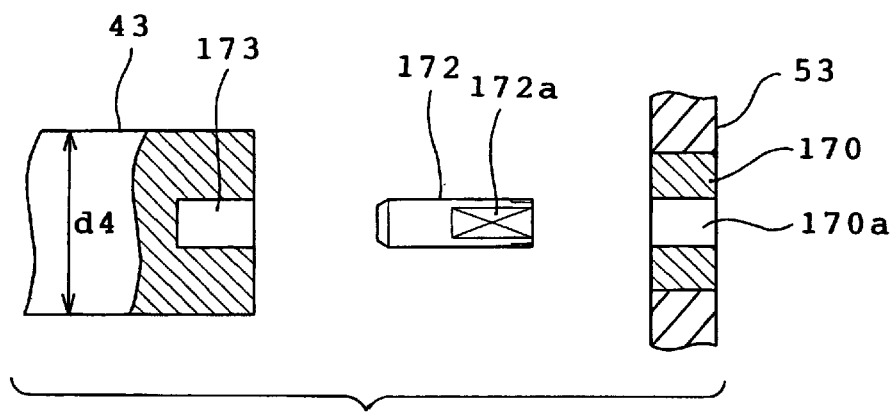
FIG. 13B illustrates a power transmission mechanism in the drum type washing machine in which the rotational speed is set at a middle speed.
Figure 13C:
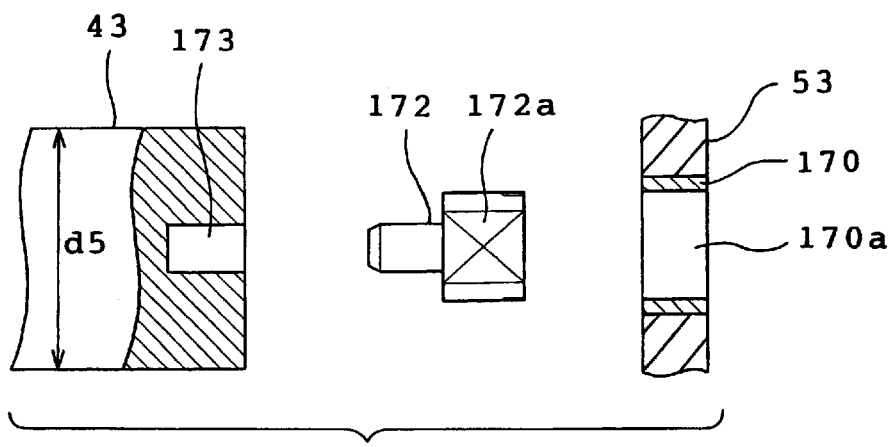
FIG. 13C illustrates a power transmission mechanism in the drum type washing machine in which the rotational speed is set at a high speed.
Figure 14:
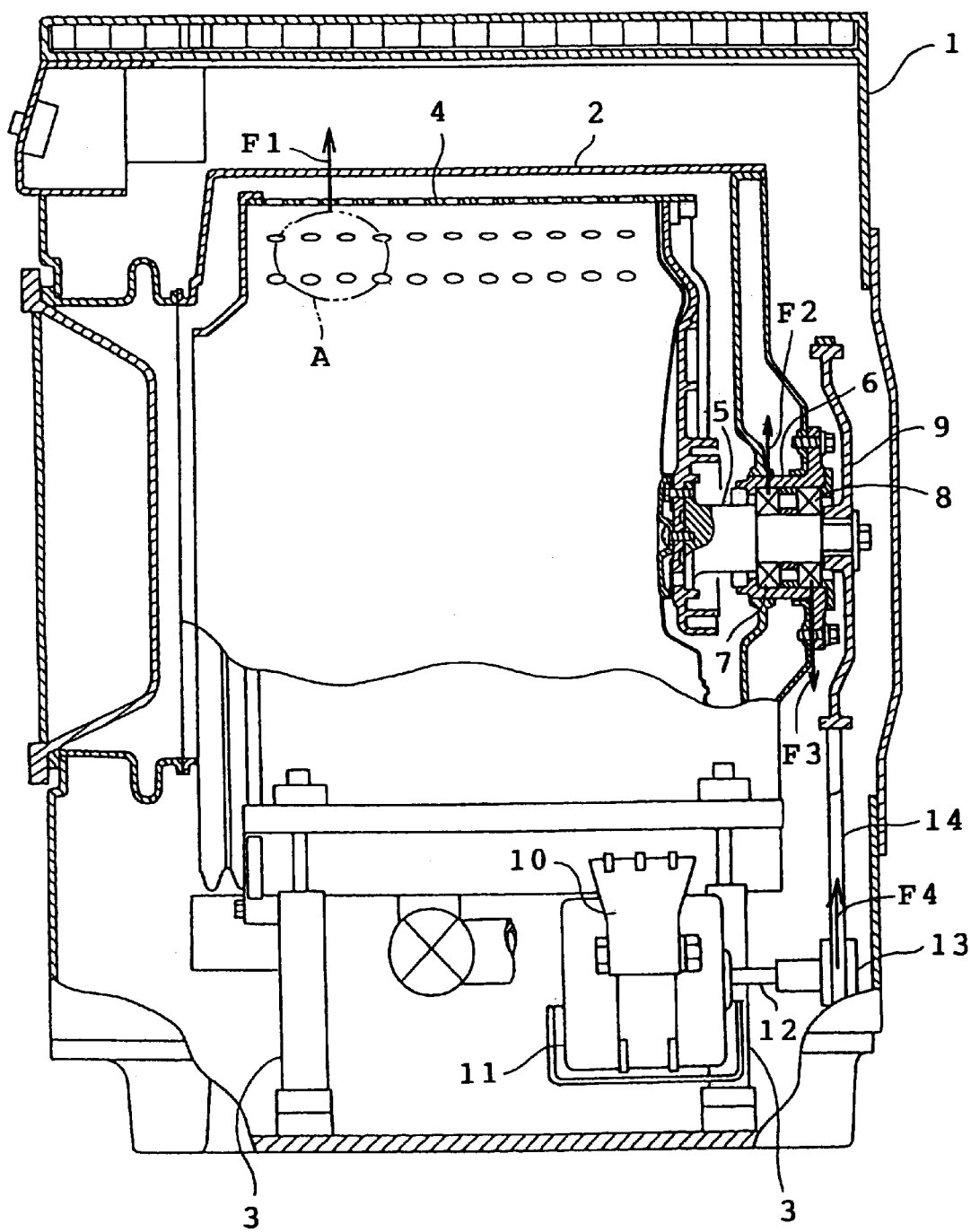
FIG. 14 is a longitudinal section of a conventional drum type washing machine with an electric motor mounted on a lower part of the water tub.
Figure 15:
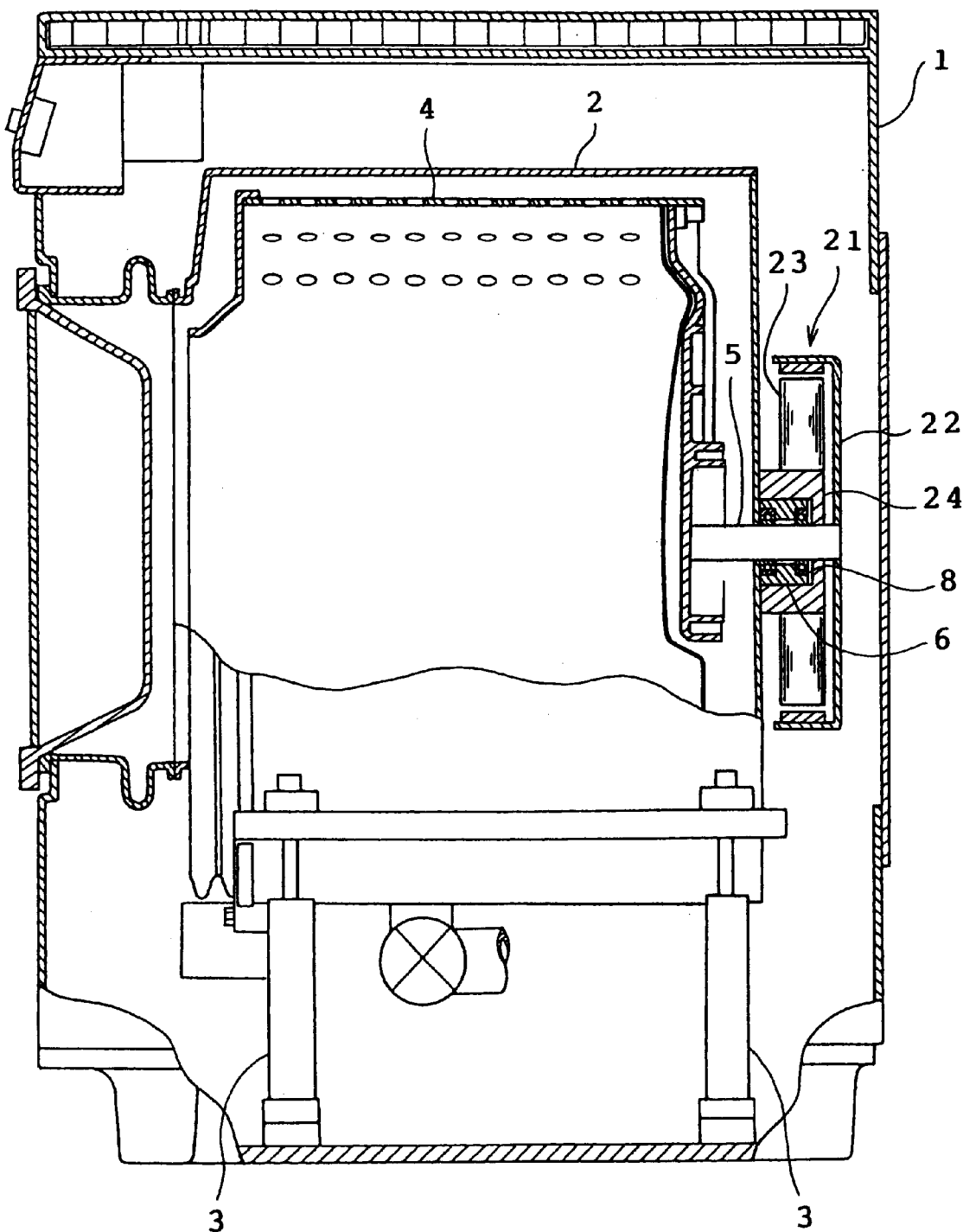
FIG. 15 is a longitudinal section of a conventional drum type washing machine with a direct drive mechanism.

FIG. 13A illustrates a power transmission mechanism in the drum type washing machine in which the rotational speed of the rotating tub in the dehydrating operation is set at a low speed. FIG. 13B illustrates a power transmission mechanism in the drum type washing machine in which the rotational speed (1000 rpm or above, for example) is set at a middle speed. FIG. 13C illustrates a power transmission mechanism in the drum type washing machine in which the rotational speed is set at a high speed. The washing machines are set at the same washing/dehydrating capacity irrespective of rotational speeds.

As shown in FIGS. 13A to 13C, when d3, d4 and d5 designate outer diameters of the washing machines of the low, intermediate and high speed types respectively, d3<d4<d5. The reason for this relation is that the washing machine of the higher rotational speed type needs to have a larger outer diameter than that of the lower rotational speed type in order that the strength of the shaft 43 may be increased. Further, in a case where the washing/dehydrating capacity is small, a drive torque required in the dehydrating operation is smaller than a drive torque required in the washing operation in each of the washing machines of the low and intermediate speed types. Accordingly, the sizes of the flat faces 170a and 172a are set according to the drive torque required in the washing operation in each of these types of washing machines. Thus, as shown in FIGS. 13A and 13b, the washing machines of the low and intermediate speed types are provided with the same connecting member 170 and receiving member 172.

On the other hand, in a case where the washing/dehydrating capacity is small, a drive torque required in the dehydrating operation is larger than a drive torque required in the washing operation in the washing machine of the high speed type. Accordingly, the sizes of the flat faces 170a and 172a are set according to the drive torque required in the dehydrating operation in the washing machine of the high speed type. Thus, as shown in FIG. 13C, the washing machine of the high speed type is provided with larger flat faces 170a and 172a than those of the washing machines of the low and intermediate speed types. In this case, too, the inner diameter of the connecting member 170 is changed so that the size of the flat face 170a is changed. The outer diameter of the connecting member 170 is unchanged. Further, the outer diameter of the second end of the receiving member 172 is changed so that the size of the flat face 172a is changed. The outer diameter of the first end of the receiving member 172 is unchanged.

Accordingly, only the rotating tub shaft 43 is changed to one with a larger outer diameter when the washing machine is changed from the low speed type to the intermediate speed type. When the washing machine is changed from the low or intermediate speed type to the high speed type, the rotating tub shaft 43 is changed to one with a larger outer diameter and the connecting and receiving members 170 and 172 are changed to ones with larger flat faces 170a and 172a respectively. When the washing/dehydrating capacity or the rotational speed in the dehydrating operation is changed, the motor is changed to one which can develop a required torque. An electric motor developing a larger torque may be used so as to cope with a washing machine of large capacity type or high speed type.

According to the fifth embodiment, the shaft 43 is connected via the connecting member 170 and the receiving member 172 to the rotor 53. When the construction of the power transmission mechanism is changed according to the washing/dehydrating capacity or the rotational speed in the dehydrating operation, one, two or all of the shaft 43, connecting member 170 and receiving member 172 are replaced. This manner clearly differs from the case where the construction of the power transmission mechanism is changed by cutting. Consequently, the construction of the power transmission mechanism can easily be changed. Further, the change in the construction of the power transmission mechanism does not result in disalignment between the center of rotation of the rotor 53 and the center of the stator 54. The connecting member 170 and the receiving member 172 constitute a center aligning structure.

The connecting member 170 is integrated with the rotor 53 by the insert molding in the embodiment. Further, the receiving member 172 is press-fitted in the hole 173 of the shaft 43. Accordingly, even when the rotor 53 and shaft 43 are connected by the connecting and receiving members 170 and 172 which are discrete from them, the strength of each connected portion can be prevented from being reduced.

The axial dimension L1 of each end face 61a may be set to be equal to the axial dimension L2 of the protrusion 58 of the stator 54. Further, the motor 52 may be of the inner rotor type in which the rotor 53 is located inside the stator 54. The rotating tub 33 may be mounted obliquely. The drying function may or may not be provided.

The fifth embodiment may be combined with each one of the first to fourth embodiments. More specifically, the center aligning structure may comprise the positioner and the connecting member. Further, the connecting member may comprise only the connecting member 170 or only the receiving member 172. The rotor 53 and shaft 43 may be connected by a connecting member formed by integrating the connecting and receiving members 170 and 172. The receiving member 172 may be screwed to the shaft 43.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. The drum type washing machine comprising:

an outer cabinet;

a water tub mounted in the outer cabinet and having a rear end plate;

a generally drum-shaped rotating tub rotatably mounted in the water tub and having a rear wall;

a rotating tub shaft provided on a center of the rear wall of the rotating tub and having a rear end projecting rearward to be located in the rear of the rear end plate of the water tub;

an electric motor provided for rotating the rotating tub via the rotating tub shaft, the motor including a stator provided on the rear end plate of the water tub and a rotor connected to the rear end of the rotating tub shaft;

a bearing housing provided on the rear end plate of the water tub and having a bearing element supporting the rotating tub shaft so that the rotating tub shaft is rotatable; and an aligning structure for aligning a center of rotation of the rotor and a center of the stator, the aligning structure including a positioner formed integrally on an outer periphery of the bearing housing for radially positioning the stator.

2. The drum type washing machine according to claim 1, wherein the positioner includes an abutting portion abutting against the stator radially outward, and the abutting portion has an axial dimension equal to or larger than an axial dimension of the stator.

3. The drum type washing machine according to claim 1, wherein the stator is fixed to the bearing housing.

4. The drum type washing machine according to claim 1, wherein the motor is of an outer rotor type, the stator has such a generally annular shape as to surround the bearing housing, the stator having an inner circumferential face formed with an inwardly extending protrusion, and the positioner is constructed so as to abut against the protrusion.

5. The drum type washing machine according to claim 1, wherein the motor is of an outer rotor type, the stator has such a generally annular shape as to surround the bearing housing, the stator having an inner circumferential face, and the positioner is formed into such a generally convex shape as to outwardly extend such that the protrusion abuts against the inner circumferential face of the stator.

6. The drum type washing machine according to claim 1, further comprising a reinforcement for reinforcing the rear end plate of the water tub, wherein the bearing housing is formed integrally with the reinforcement, and the positioner is disposed on the outer periphery of the bearing housing so as to align with the reinforcement.

7. The drum type washing machine according to claim 2, further comprising a reinforcement for reinforcing the rear end plate of the water tub, wherein the bearing housing is formed integrally with the reinforcement, and the stator is fixed to the reinforcement.

8. The drum type washing machine according to claim 1, wherein the water tub includes a reinforcement provided on a rear of the rear end plate for reinforcing the rear end plate, and the rear end plate, the reinforcement and the bearing housing are formed integrally from a synthetic resin.

9. The drum type washing machine according to claim 1, further comprising a bearing housing provided on the rear end plate of the water tub and having an bearing element supporting the rotating tub shaft so that the rotating tub shaft is rotatable, and the aligning structure includes a positioner formed integrally on an outer periphery of the bearing housing for radially positioning the stator, wherein the water tub includes a reinforcement provided on a rear of the rear end plate for reinforcing the rear end plate.

10. The drum type washing machine according to claim 1, wherein the aligning structure includes a connecting member connecting the rotor and the rotating tub shaft to each other.

11. The drum type washing machine according to claim 10, wherein the connecting member includes a rotor connecting member mounted to the rotor and a shaft connecting member mounted to the rotating tub shaft.

12. The drum type washing machine according to claim 11, wherein the rotor connecting member is formed on the rotor by an insert molding.

13. The drum type washing machine according to claim 11, wherein the shaft connecting member is press fitted in the rotating tub shaft.

* * * * *